United States Patent [19]

Stevens

[11] 4,213,246
[45] Jul. 22, 1980

[54] COLLAPSIBLE AND ADJUSTABLE GAGE APPARATUS

[76] Inventor: Daniel M. Stevens, 545 Pine Forest Dr., Athens, Ga. 30606

[21] Appl. No.: 926,522

[22] Filed: Jul. 20, 1978

[51] Int. Cl.² .......................... G01B 3/02; E21B 17/10
[52] U.S. Cl. .................................................... 33/178 F
[58] Field of Search .............. 33/178 F, 174 R, 178 R

[56] References Cited

U.S. PATENT DOCUMENTS

| | | | |
|---|---|---|---|
| 1,591,394 | 7/1926 | McGrath | 33/149 |
| 2,267,110 | 12/1941 | Kinley et al. | 33/178 F |
| 2,499,251 | 2/1950 | Marascio | 33/178 R |
| 2,829,441 | 4/1958 | Bagnell | 33/178 F |
| 3,081,548 | 3/1963 | Schwartz | 33/178 R |
| 3,349,498 | 10/1967 | Oliver et al. | 33/178 F |
| 3,533,166 | 10/1970 | Pino, Jr. | 33/174 R |
| 3,977,468 | 8/1976 | Brewer et al. | 33/178 F |

*Primary Examiner*—Willis Little
*Attorney, Agent, or Firm*—Jones, Thomas & Askew

[57] ABSTRACT

A collapsible and adjustable gage apparatus comprising a plurality of wear link members adapted to engage the inner walls of pipe, which members are pivotally attached through articulated mechanical arms to a rotatably adjustable collar and to a slidable, releasable collar. The gage apparatus may be adapted to different diameters of pipe by varying the distance between the adjustable collar and the releasable collar. The gage apparatus may be collapsed for easier withdrawal from a pipe by actuating the catch mechanism which holds the releasable collar in a fixed position, permitting the releasable collar to slide away from the adjustable collar, thereby collapsing the wear link members and articulated arms so as to reduce the effective diameter of the apparatus to its smallest possible size.

6 Claims, 2 Drawing Figures

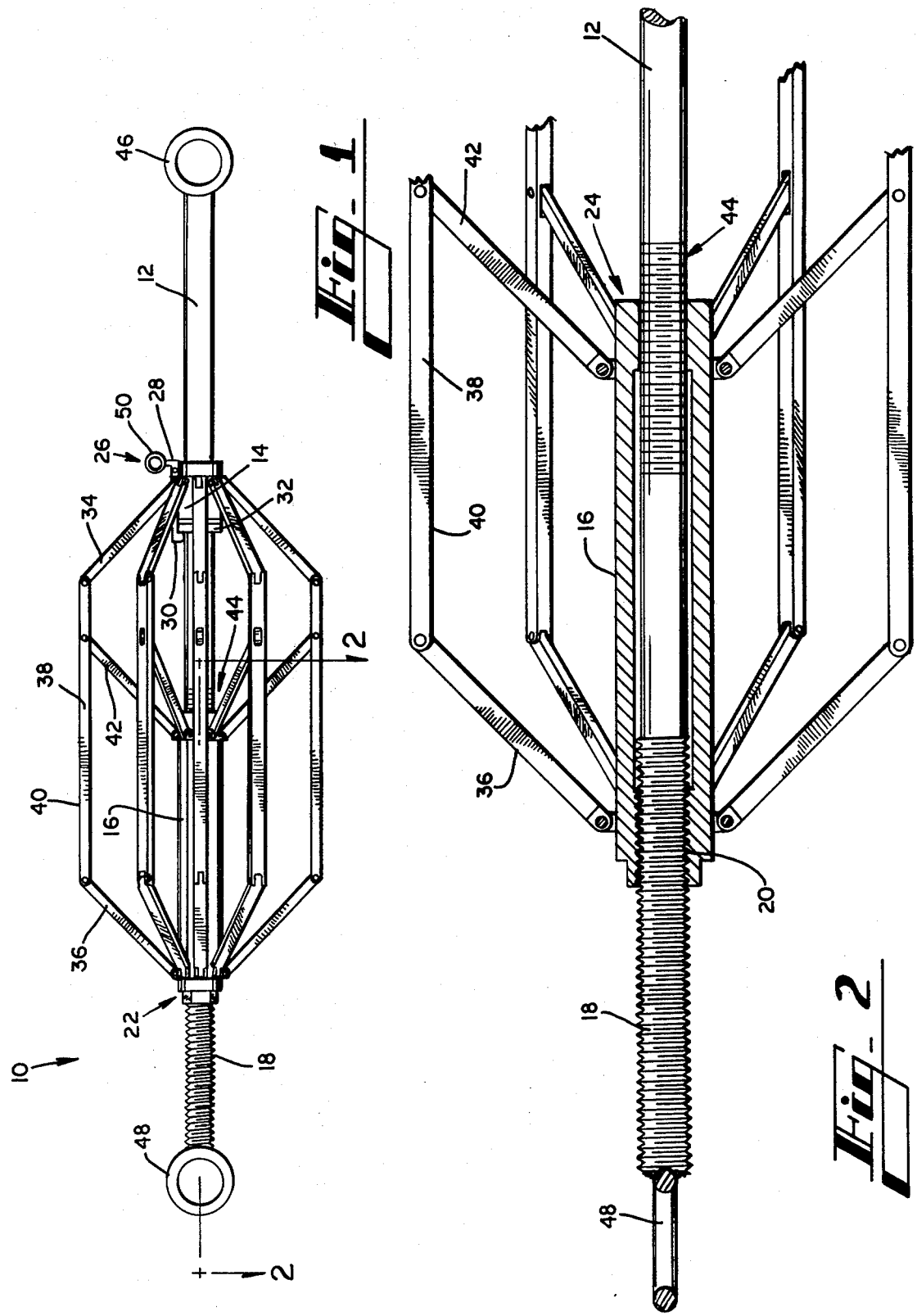

COLLAPSIBLE AND ADJUSTABLE GAGE APPARATUS

The present invention relates in general to an adjustable gage apparatus, and more particularly to a collapsible and adjustable gage apparatus.

In the manufacture of pipe and in the installation of pipe for pipelines, casings for wells and the like, it is often desirable to check the inside of the pipe for uniformity in size and for defects therein. In this manner, flaws which could cause weaknesses in the pipe or undesirable resistance to flow through the pipe may be detected before the pipe is sold or put into service.

Many different types of apparatus are known to be suitable for performing this inspection operation. Inspection gages or mandrels of a fixed size are often used. However, a fixed size gage is only useful for a signle corresponding size pipe. A different size gage must therefore be used for each different size pipe being inspected. This limitation lead to various adjustable-type gages which could be used to inspect a wide variety of pipe sizes.

The inspection operation is typically performed in the prior art by passing a rope, cable, or the like through the pipe to be inspected. A fixed or adjustable gage apparatus is adjusted to closely conform to the inner walls of the pipe and is then attached to one end of the rope. The gage is then pulled through the pipe by pulling on the free end of the rope at the opposite end of the pipe. When an obstruction is encountered, the gage will resist being pulled through the pipe any further and the length of rope pulled through the pipe indicates the location of the obstruction. The gage may then be backed out of the pipe by pulling on a second rope attached to the other end of the gage. However, sometimes the gage will "hang up" on the obstruction and become stuck in the pipe. When this occurs, it is often necessary to cut the pipe in order to remove the stuck gage. This is usually a very costly operation.

SUMMARY OF THE INVENTION

Generally speaking, the present invention provides a collapsable and adjustable gage apparatus for measuring the inside diameter of pipe and for detecting defects therein. More specifically, the present invention comprises a plurality of wear link members adapted to engage the inner walls of pipe. These wear link members are pivotally attached through articulated mechanical arms to a rotatably adjustable collar and to a slidable, releasable collar. By varying the distance between the adjustable collar and the releasable collar, the effective diameter of the apparatus may be adjusted in its extended configuration to fit different diameters of pipe.

A unique feature of the present invention is that the gage apparatus may be converted from its extended configuration to a collapsed configuration to facilitate its withdrawal from a pipe. This collapsible feature is provided by the releasable collar. When a catch mechanism is released, the releasable collar will slide away from the adjustable collar, increasing the distance between the releasable collar and the adjustable collar, collapsing the wear link members and the articulated mechanical arms, thereby reducing the effective diameter of the apparatus to its smallest possible size.

Accordingly, it is an object of the present invention to provide an improved gage apparatus for inspection of the inside of pipe.

Another object of the present invention is to provide an adjustable gage apparatus.

A further object of the present invention is to provide a collapsible gage apparatus.

Yet another object of the present invention is to provide a collapsible gage apparatus which may be converted from its extended to its collapsed configuration while the apparatus is inside a pipe.

These and other objects, features and advantages of the present invention will become apparent from a review of the following detailed description of a disclosed embodiment and the appended drawing and claims.

BRIEF DESCRIPTION OF THE DRAWINGS

FIG. 1 is a plan view of a disclosed embodiment of the gage apparatus of the present invention.

FIG. 2 is a cross-sectional view of the adjustable collar taken along the line 2—2 of the gage apparatus shown in FIG. 1.

DETAILED DESCRIPTION OF THE DISCLOSED EMBODIMENT

Referring now to the drawing in which like numbers indicate like elements, it will be seen that there is a gage apparatus 10 adapted to be pulled through pipe in order to locate defects therein. The apparatus 10 includes a central shaft 12 having a releasable collar 14 and an adjustable collar 16 both slidably and rotatably mounted thereon. It will be noted that an end portion of the shaft 12 has threads 18 cut into the shaft's surface. These threads 18 are adapted to accommodate threads 20 in the end 22 of the collar 16. The opposite end 24 of the collar 16 does not have any threads therein, but rather, slides freely on the smooth, unthreaded portion of the shaft 12. It will therefore be appreciated that when the collar 16 is rotated on the shaft 12, the threaded portion of the shaft and the collar will cause the collar to translate longitudinally along the length of the shaft.

The releasable collar 14, which is rotatably and slidably mounted along the length of the shaft 12, is selectively prevented from sliding, but not from rotating, on the shaft by a latch mechanism 26. The latch mechanism 26 includes a lever 28 pivotally attached to the collar 14 and a catch arm 30 which is raised or lowered by movement of the lever. The catch arm 30 is adapted for engagement of a latch collar 32 which is firmly attached to the shaft 12. When the catch arm 30 engages the latch collar 32, the releasable collar 14 is prevented from sliding along the length of the shaft 12, but may still be freely rotated on the shaft.

Extending radially from the adjustable collar 16 and the releasable collar 14 is a series of articulated mechanical arms 36 and 42. Extending from the releasable collar 14 are eight support arms 34 which are pivotally attached at one end to the releasable collar. Similarly, extending from the adjustable collar 16 are eight support arms 36 which are pivotally attached at one end to the adjustable collar. The other end of each support arm 34 is pivotally attached to one end of a wear link 38. The other end of each wear link 38 is pivotally attached to the other end of the corresponding support arm 36. Each wear link 38 has a flat smooth surface 40 on the side opposite the shaft 12. This smooth flat surface 40 is designed for slidably contacting the inner walls of pipe as the apparatus is pulled therethrough.

In order to maintain the wear links 38 in an orientation substantially parallel to the shaft 12 and thereby maintain maximum surface 40 contact with the inner walls of a pipe, one end of a leveling arm 42 is pivotally attached to each wear link 38 and the other end of each leveling arm is pivotally attached to the adjustable collar 16. The points of attachment of each leveling arm 42 on the adjustable collar 16 and the wear link 38 are such that the leveling arm is substantially parallel to the support arm 36. The resulting shape formed by the adjustable collar 16, the support arm 36, the wear link 39 and the leveling arm 42 is that of a parallelogram. In this manner, the wear link 38 is always maintained in a substantially parallel relationship to the shaft 12.

The framework comprising the support arms 34,36 and the wear links 38 forms an expandable cylindrical skeleton about the shaft 12 and having a cone-shaped skeleton at each end of the cylindrical skeleton. It will be appreciated that when the latch mechanism 26 is locked so that the latch arm 30 engages the latch collar 32, the gage apparatus 10 is in its expanded configuration thereby providing a cylindrical skeleton having an effective diameter of several times that of the shaft 12 alone. It will also be appreciated that the effective diameter of the cylindrical skeleton may be increased or decreased by adjusting the separation of the adjustable collar 16 from the releasable collar 14. This adjustment may be easily made by rotating the adjustable collar 16 and the releasable collar 14, connected thereto by the articulated mechanical arms, on the shaft 12. The rotation of the adjustable collar 16 on the shaft 12 causes the adjustable collar to screw or unscrew along the threads 18 depending on the direction of rotation. Since the releasable collar 14 is prevented from sliding along the length of the shaft 12 by the latch mechanism, the screwing and unscrewing of the adjustable collar 16 varies the distance on the shaft between the adjustable collar and the releasable collar and thereby adjusts the effective diameter of the cylindrical skeleton. A scale 44 provided on the shaft 12 indicates the separation of the adjustable collar 16 from the releasable collar 14, thereby permitting a direct reading of the effective diameter of the cylindrical skeleton.

A unique feature of the present invention is the fact that when the latch arm 30 is disengaged from the latch collar 32, the releasable collar 14 is free to slide along the length of the shaft 12. Thus, it will be appreciated that when the latch mechanism 26 is released, the releasable collar 14 may be slid along the length of the shaft 12 to a position on the shaft further removed from the adjustable collar 16. This greater separation of the adjustable collar 16 and the releasable collar 14 reduces the effective diameter of the cylindrical skeleton. When the releasable collar 14 is slid to the furtherest point possible on the shaft 12, the effective diameter of the cylindrical skeleton is only slightly greater than that of the shaft, thereby providing a collapsed configuration of the gage apparatus 10.

Since the apparatus is usually pulled through pipe with ropes, cables or the like, rope attachment rings 46,48 are provided on each end of the shaft 12. Also, similar means may be used to release the catch mechanism 26 so an attachment ring 50 is provided on the lever 28.

In operation, the latch arm 30 is first engaged with the latch collar 32 so as to prevent the releasable collar 14 from sliding on the shaft 12. One end of a first rope, which has been passed through a pipe, is attached to the ring 48. The adjustable collar 16 is rotated on the shaft 12 so that the effective diameter of the cylindrical skeleton matches the inside diameter of the pipe being inspected. A second rope is attached to the ring 46 and a third rope is attached to the ring 50 on the lever 28.

The gage apparatus 10 is then placed in the end of the pipe being inspected and pulled through the pipe by pulling on the first rope. Since the effective diameter of the cylindrical skeleton has been adjusted to match the inside diameter of the pipe, the surfaces 40 of the wear links 38 are in contact with the inner walls of the pipe. Therefore, when an obstruction is encountered or when the inside diameter diminishes to a size smaller than the effective diameter of the cylindrical skeleton, the gage apparatus will resist being pulled through the pipe any further.

When the apparatus 10 encounters such an obstruction or becomes stuck in the pipe it may be easily removed from the pipe by pulling on the third rope attached to the ring 50. This disengages the latch arm 30 from the latch collar 32 and slides the releasable collar 14 along the length of the shaft 12. This causes the gage apparatus 10 to collapse to a size that may be easily pulled free of an obstruction or a restriction in the pipe. The apparatus 10 may then be removed from the pipe by pulling on the free ends of any of the ropes attached to the apparatus. Even if the apparatus 10 did not become stuck when encountering the restriction or obstruction, the apparatus can be removed more rapidly in its collapsed configuration. If the length of the rope at the point at which the apparatus 10 encountered the obstruction or restriction was noted, it is possible to determine the exact point in the pipe where the obstruction or restriction is located.

It should be understood, of course, that the foregoing relates only to a preferred embodiment of the present invention and that numerous modifications or alterations may be made therein without departing from the spirit and scope of the invention as set forth in the appended claims.

What is claimed is:

1. A collapsible and adjustable gage apparatus for inspecting the inside of pipe, said apparatus having an expanded and a collapsed configuration and comprising:
   a shaft;
   first collar mounted on said shaft;
   second collar mounted on said shaft;
   a plurality of wear link members for engaging the innerwalls of pipe;
   at least two articulated mechanical arms having one end of said arms pivotally attached to each of said wear link members, with the other end of one of said arms pivotally attached to said first collar and the other end of the other of said arms being pivotally attached to said second collar;
   means for adjusting said first collar relative to said shaft, whereby said apparatus in said expanded configuration rigidly adjusts the position of said wear link members to engage the inner walls of different diameter pipe; and
   means for releasing said second collar, whereby said apparatus is collapsed to a reduced size.

2. The collapsible and adjustable gage apparatus of claim 1, wherein said means for adjusting said first collar comprises screw means for varying the separation of said first collar from said second collar on said shaft.

3. The collapsible and adjustable gage apparatus of claim 1, wherein said means for releasing said second collar comprises a third collar attached to said shaft; and latch means on said second collar for engagement with said third collar, whereby the separation of said first and second collar is maintained at a predetermined relation until said latch means disengages said third collar to permit said apparatus to collapse.

4. The collapsible and adjustable gage apparatus of claim 1 further comprising graduations on said shaft for providing an indication of the effective diameter of said apparatus in said expanded configuration.

5. A collapsible and adjustable gage apparatus for inspecting the inside of pipe, said apparatus having an expanded and a collapsed configuration and comprising:

shaft means;

a plurality of wear link members;

means for attaching said wear link members radially separated from said shaft means such that said wear link members are maintained in a substantially parallel relationship with said shaft in both said expanded and said collapsed configuration;

means operatively associated with said shaft means and said attaching means for rigidly varying the radial separation of said wear link members from said shaft means when said apparatus is in said expanded configuration; and means operatively associated with said shaft means and said attaching means for converting said apparatus from said expanded configuration to said collapsed configuration by altering a point of attachment of said wear link members to said shaft means.

6. A collapsible and adjustable gage apparatus for inspecting the inside of the workpiece such as a pipe or the like, said apparatus having an expanded configuration and a collapsed configuration and comprising:

central support means;

gage means carried by said central support means and selectable adjustably expandable outwardly therefrom to provide a rigidly expanded gage configuration of predetermined diameter; and means operatively associated with said gage means for selectably adjusting said gage means to an expanded configuration and selectably operable independently of said gage means adjustability to cause said gage means to immediately assume a collapsed configuration of minimum diameter, so as to facilitate movement of said gage apparatus relative to the workpiece.

* * * * *